United States Patent [19]
Lozada

[11] Patent Number: 6,073,448
[45] Date of Patent: Jun. 13, 2000

[54] METHOD AND APPARATUS FOR STEAM GENERATION FROM ISOTHERMAL GEOTHERMAL RESERVOIRS

[76] Inventor: Vince M. Lozada, 1515 Burning Tree Dr., Thousand Oaks, Calif. 91362-1309

[21] Appl. No.: 09/140,843

[22] Filed: Aug. 27, 1998

[51] Int. Cl.[7] .................................................. F01K 27/00
[52] U.S. Cl. ........................................ 60/641.2; 60/641.1
[58] Field of Search ............................... 60/641.1, 641.2, 60/641.5

[56] References Cited

U.S. PATENT DOCUMENTS

| | | |
|---|---|---|
| 3,470,943 | 10/1969 | Van Huisen . |
| 3,857,244 | 12/1974 | Faucette . |
| 3,875,749 | 4/1975 | Baciu . |
| 4,043,129 | 8/1977 | McCabe et al. ................ 60/641.2 |
| 4,512,156 | 4/1985 | Nagase . |
| 4,728,438 | 3/1988 | Featherstone et al. ............ 60/641.2 X |
| 4,741,398 | 5/1988 | Goldsberry ................ 60/641.2 X |
| 4,776,169 | 10/1988 | Coles, Jr. . |
| 5,143,150 | 9/1992 | Johnston . |
| 5,515,679 | 5/1996 | Shulman . |

*Primary Examiner*—Hoang Nguyen
*Attorney, Agent, or Firm*—Knobbe, Martens, Olson & Bear, LLP

[57] ABSTRACT

A geothermal energy conversion system extracts heat from a heat source below the Earth's surface, which has a temperature above that of a fluid circulating through a closed system. A geothermal well and an enclosed well casing define a space that extends from ground level to the heat source. A heat exchanger is in thermal communication with the heat source, and a system of valves and at least one pump is in fluid communication, through the space within the well, with the heat exchanger. The system of pumps and valves regulates at least one of the flow rate or the pressure of the fluid so that the fluid vaporizes within the heat exchanger, the rate of vapor production in the heat exchanger is set at a predetermined value, and build-up of liquid within the heat exchanger is controlled.

27 Claims, 7 Drawing Sheets

METHOD AND APPARATUS FOR STEAM GENERATION FROM ISOTHERMAL GEOTHERMAL RESERVOIRS

BACKGROUND OF THE INVENTION

This invention relates in general to the recovery of energy from below the Earth's surface and more particularly to improvements in such energy recovery systems.

Within the past few decades commercial use of geothermal energy has acquired a greater status and interest because of the long range dwindling of fossil fuel sources of energy and tragic experiences with nuclear power plants. Current technology associated with geothermal energy conversion has primarily been directed to the extraction of heat from readily available natural heat sources located beneath the Earth's crust and readily exposed by the drilling of relatively shallow wells. These wells are drilled to the depth of the Earth's isothermal zone, a geothermal heat source, which is essentially comprised of a mixture of hot liquid and vapor brine. Geothermal reservoirs have moderate (250° F. to 350° F.) to high (greater than 350° F.) temperatures at the isothermal zone. Geothermal energy recovery systems commonly use fluids, such as water, to extract heat from the brine. This is accomplished by pumping a fluid through pipes contained in a well casing. The fluid absorbs heat from the isothermal zone, and energy is recovered as the fluid, or media heated by the fluid, flows through a workload, such as a turbine.

A variety of known methods exist for conversion of geothermal energy. One method is to force hot vapor and brine to the Earth's surface by the drilling of pipes into the ground that connect to geothermal heat sources. The pressure of these heat sources can force hot vapor and even liquid brine to flow up such pipes to ground level. Heat exchangers are used at ground level to extract heat from such vapor and brine.

But this method is problematic. Vapor derived from such wells is wet steam, a saturated mixture of steam and liquid. Such natural steam carries suspended elements which are frequently not compatible with the moving and stationary components of a turbine. Natural geothermal steam typically needs additional processing before it can be used to drive or supply heat to machinery. In brine producing wells, the liquid brine also suffers considerable heat loss before it reaches ground level. Spent brine is generally returned underground to absorb more heat.

Another technique involves placing heat exchangers in downhole submerged positions. One problem with this method is the task of regulating the movement of heat transfer fluids in order to achieve optimum energy output. When too much heat transfer fluid passes through the heat exchanger, the product vapor is a saturated mixture of steam and liquid, which is frequently incompatible with the components of a turbine. Conversely, when too little moves through the heat exchanger, energy output from the system is too low to be commercially feasible. Another problem is that fluid tends lose heat as it exits the well. Thermally insulating the exit pipe is difficult and expensive.

There is thus a need for a geothermal energy recovery system that provides a method and apparatus to facilitate heat exchange at the brine level while at the same time reducing heat loss as heated fluid is brought out of the ground. Such reduced heat loss results in a higher thermal efficiency of the overall power cycle. There is also a need for a method of regulating the flow rate and pressure of heat transfer fluids so that the fluids vaporize within the heat exchanger to produce a more usable product vapor.

SUMMARY OF THE INVENTION

In accordance with the present invention, a geothermal well is used to extract heat from a heat source located below the Earth's surface, by circulating a heat transfer fluid through a closed system. Enclosed within the well is a well casing which defines a space that extends to the heat source. The upper end of the casing is sealed with a cap to form geothermal vapor within the casing and to effectively form a large heat pipe within the casing. The heat exchanger is advantageously located within or below the well, but it can be located anywhere as long as it is in thermal communication with the heat source.

The well casing extends to a depth below the liquid brine surface level, and is sealed with a cap to form brine vapor within the casing. Above the liquid brine surface level, the casing restrains the entry into the well of substances contained within the Earth. However, below this level, the casing is perforated with holes, allowing liquid brine to enter into the well. In this manner, the casing does not displace the liquid brine. The heat exchanger is submerged within the liquid brine. An inlet pipe extends from above ground level, through the cap and the space within the casing, and into the heat exchanger. An outlet pipe extends up from the heat exchanger, through the space within the casing and the upper cap. There is thus advantageously provided a geothermal energy recovery system that provides a method and apparatus to facilitate heat exchange at the brine level while at the same time reducing heat loss as heated fluid is brought out of the ground.

There is thus advantageously provided a geothermal well with a casing defining a space that extends to the heat source. A heat exchanger is placed in thermal communication with the heat source to boil the liquid within the heat exchanger. A system of valves and at least one pump regulate the flow of fluid through the heat exchanger. A cap at the upper end of the casing seals the casing to form a geothermal vapor within said space.

Advantageously, a system of valves and at least one pump regulates at least one of flow rate or pressure of said fluid so that the fluid vaporizes within the heat exchanger, the rate of vapor production in said heat exchanger being set at a predetermined value with the system of valves and at least one pump adjusted to control buildup of liquid within the heat exchanger to ensure boiling occurs within the heat exchanger. Preferably, there are at least two valves in series that cooperate to regulate the fluid in response to the incremental change in the amount of steam output from the boiler that occurs in response to an incremental change in the flow rate caused by the series of valves.

There are thus advantageously provided means for regulating at least one of flow rate or pressure of the fluid to the inlet leading to the heat exchanger so that the fluid vaporizes within the heat exchanger. The means advantageously also regulates the rate of vapor production in the heat exchanger at a predetermined value, and further regulates the buildup of liquid within the heat exchanger.

The heat exchanger is comprised of a plurality of boilers. Any number of boilers can be cascaded within the casing. Each boiler is comprised of an inlet pipe connected to a hollow fluid collection base. A plurality of vaporization tubes extend from the fluid collection base to a vapor collection manifold, from which extends an outlet pipe. At the surface, the closed system runs through a turbine or other device for energy recovery, and a condenser to cool hot steam to a liquid state.

A system of pumps and valves is used to regulate at least one of the flow rate or pressure of the fluid introduced into the heat exchangers so that the fluid vaporizes within the heat exchangers, the rate of vapor production in the heat exchanger is set at a predetermined value, and build-up of liquid within the heat exchanger is controlled. This system comprises two valves in series to regulate the flow rate or pressure, or both. The flow rate through the heat exchangers is advantageously controlled using a predetermined algorithm described herein. There is thus advantageously provided an apparatus and method for regulating the flow rate and pressure of heat transfer fluids so that the fluids vaporize within the heat exchanger to produce a more usable product vapor.

There is also provided a method of converting geothermal energy from a heat source beneath the earth's surface using a working fluid circulating within a closed system. This method places a heat exchanger in thermal communication with the heat source to flow the working fluid through the heat exchanger. At least one of the flow rate or pressure of the fluid is regulated so that the fluid vaporizes within said heat exchanging portion. Advantageously the rate of vapor production in the heat exchanger is also regulated at a predetermined value, while also regulating buildup of liquid within the heat exchanger. These regulating steps preferably comprise regulating the flow rate of the fluid, or the pressure of the fluid.

The method preferably includes forming a heat pipe around a portion of the closed system that is in thermal communication with the heat exchanger in order to form a heat pipe effect that creates an insulating environment for the heated fluid leaving the heat exchanger. Advantageously the environment also heats the fluid flowing to the heat exchanger.

Preferably, the fluid control comprises a series of valves to achieve a method of operation. The methods includes flowing the working fluid through the heat exchanger by pumping and pressurizing a first fluid stream from a fluid source with a pump. A first valve in parallel with the pump is controlled to regulate the pressure of the fluid exiting the pump. A second valve, downstream of the pump, is controlled to achieve a desired flow rate of the fluid in the first fluid stream. A third valve, downstream of the pump, is controlled to achieve a desired pressure of the fluid in the first fluid stream. The first fluid stream is divided at a dividing junction into a second fluid stream and a third fluid stream, with the second fluid stream entering the heat exchanger and the third fluid stream returning to the fluid source. A fourth valve located in the second fluid stream, between the dividing junction and the heat exchanger, is controlled to regulate the flow rate of the fluid in the second fluid stream. A fifth valve in the third fluid stream, located between the dividing junction and the fluid source, is controlled to regulate the flow rate of the fluid in the third fluid stream. The desired flow rate in the second fluid stream is achieved by incrementally opening the fourth valve and incrementally closing the fifth valve.

A sixth valve, downstream of the heat exchanger, is used regulate the pressure of the fluid exiting the heat exchanger. Incrementally increasing the flow rate of the fluid entering the heat exchanger by controlling the fourth valve and the fifth valve to monitor a correspondingly increasing flow rate of the fluid exiting the heat exchanger. When the flow rate of the fluid exiting the heat exchanging portion ceases to increase, the incremental increase is discontinued.

Further objects, features and advantages of the present invention will become apparent from the detailed description of the drawings which follows, when considered with the attached figures, in which like numbers refer to like parts throughout.

BRIEF DESCRIPTION OF THE DRAWINGS

FIG. 5b is a schematic diagram of the bottom half of the geothermal well of FIG. 5a.

DETAILED DESCRIPTION OF THE DRAWINGS

Figure 1:
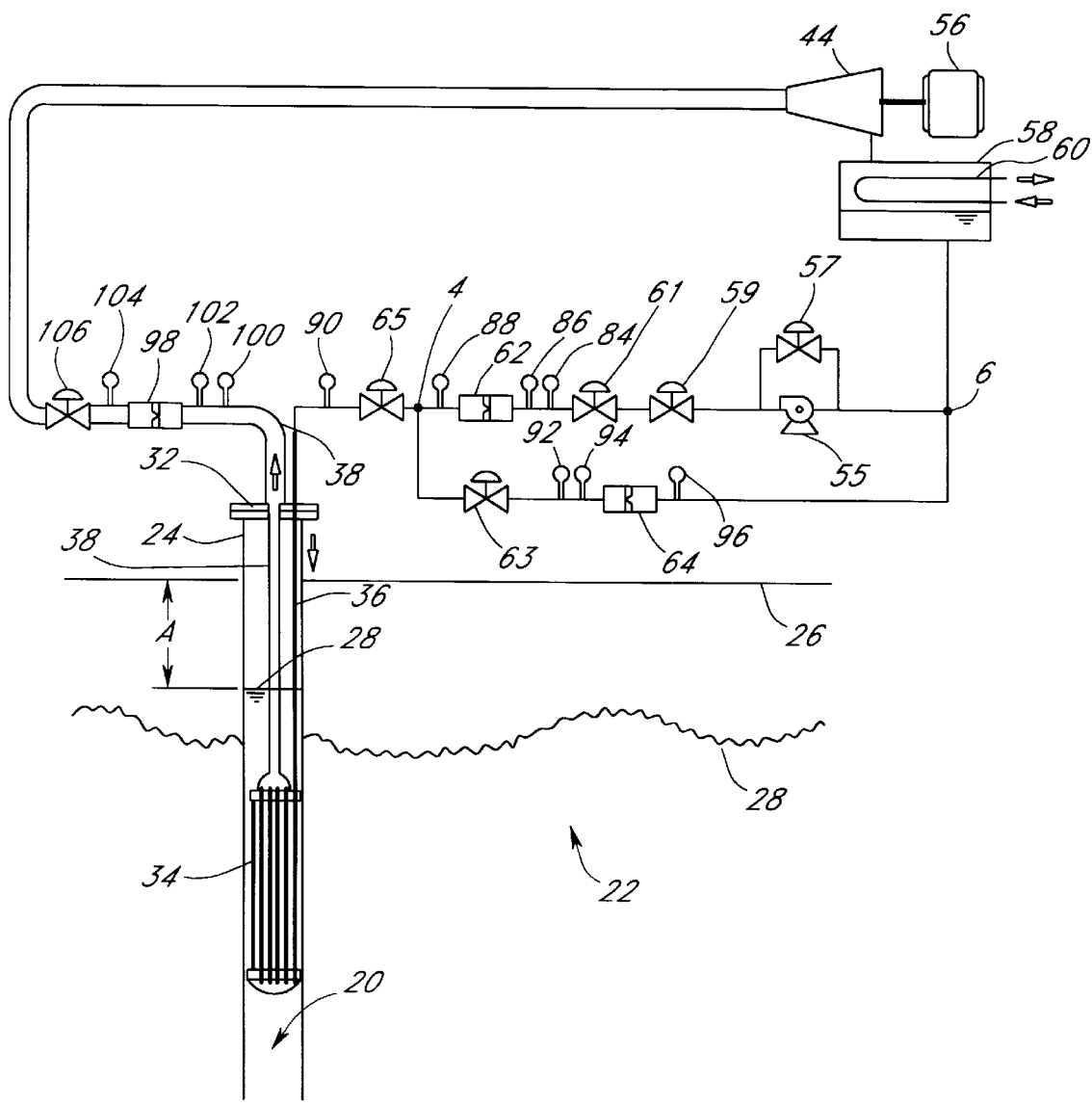
FIG. 1 is a schematic diagram of a geothermal energy conversion system of this invention, with one boiler.
Figure 2:
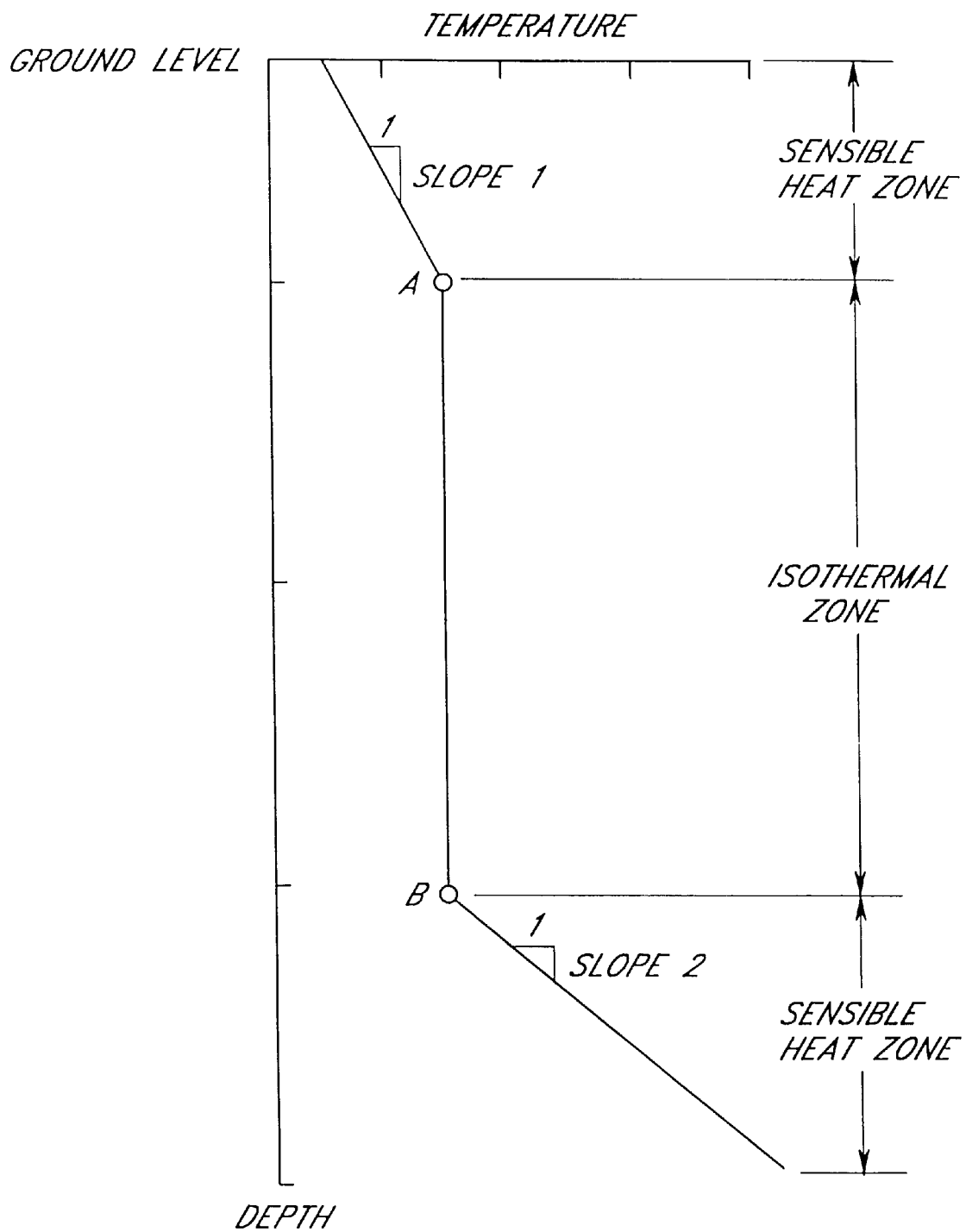
FIG. 2 shows the temperature profile, by depth, of a representative geothermal reservoir.
Figure 4:
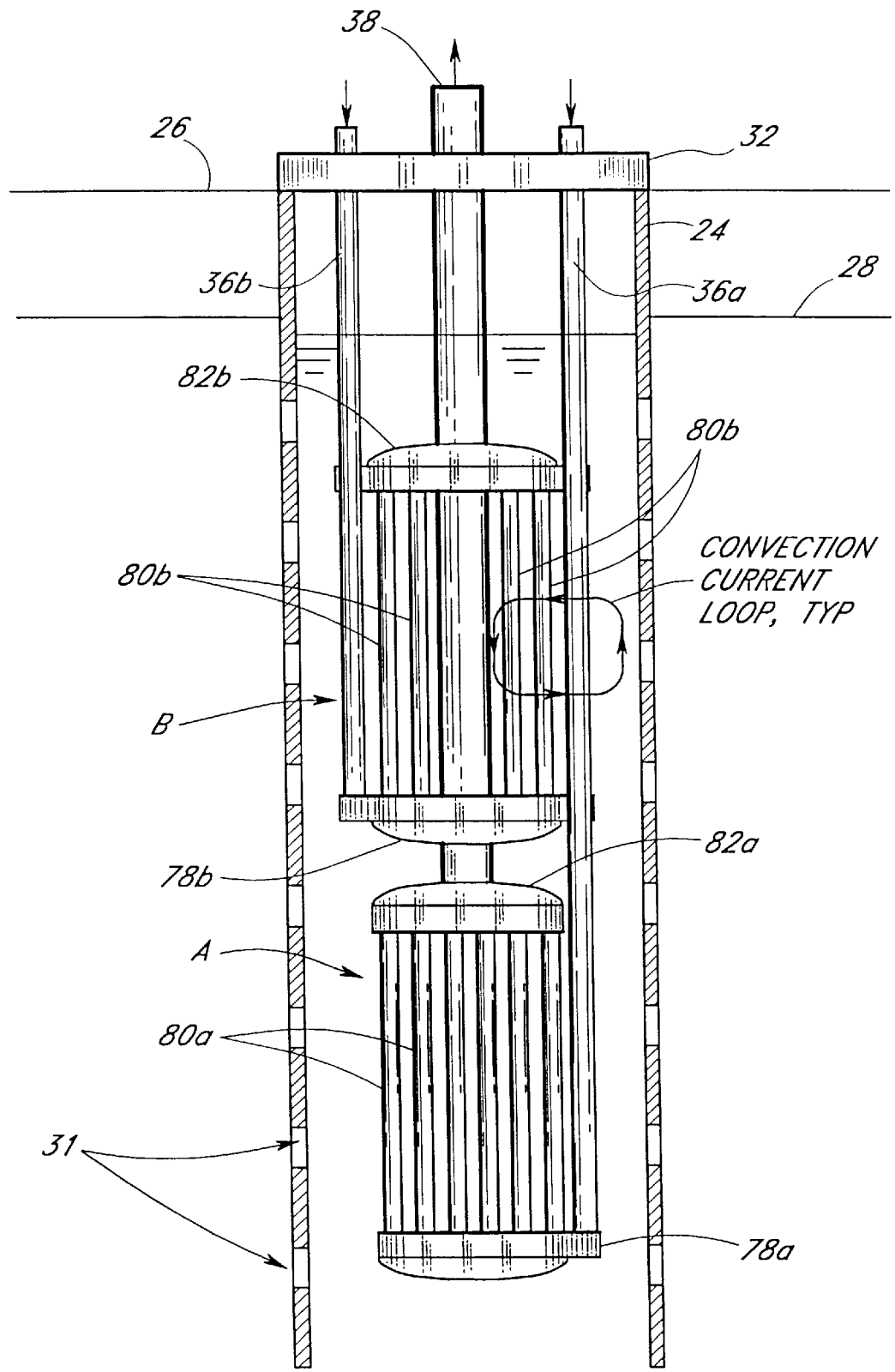
FIG. 4 is a plan view of two heat exchangers of this invention.

Referring initially to FIGS. 1 and 2, a well 20 of a diameter greater than 30 inches is drilled into the Earth's isothermal zone 22. The isothermal zone 22, a mixture of hot vapor and liquid brine, is reached at depth A. To ensure entry into the isothermal zone 22, the depth of well 20 is advantageously equal to A plus not less than about 320 feet. A well casing 24, having a diameter of about 30 inches, rests within the well 20. At the top of the well 20, a concrete foundation is poured outside the casing walls 24, from ground level 26 to a depth of 10 to 12 feet, which statically anchors the casing 24. The casing 24 advantageously extends below the liquid brine level 28. Below the liquid brine level 28, the casing walls 30 are perforated with holes 31 (FIG. 4). These perforations 31 are approximately 1 inch in diameter and arranged in either triangular or square pattern at 6-inch pitch. The holes 31 allow reservoir brine water from the liquid brine zone 30 to seep into and flood the inner space defined by the casing 24. The hole size will vary with the surrounding earth, as the holes are large enough to allow brine to enter, but small enough to keep out the earth and prevent the well 20 from filling up with earth. The upper section of the casing 24 (ground level 26 to depth A) is not perforated. The top of casing 24 is flanged, and a pressure cap 32 is provided to generate internal pressure and prevent the escape of geothermal gas, vapor, and liquid from within casing 24.

Heat exchanger 34 is advantageously located within or below the space defined by casing 24, at a depth below the liquid brine level 28. A heat exchanger can have a single heat exchanging component (such as a boiler) or a plurality of components. Heat exchanger 34 is in thermal communication with isothermal heat source 22 to generate vapor within the heat exchanger, whereby heat can flow from the isothermal zone 22 to the heat exchanger 34.

A feed pipe 36 and a steam pipe 38 are in fluid communication with heat exchanger 34. Suitable sealed holes in cap 32 allow passage of pipes 36 and 38 while maintaining a seal over the upper end of well 20. Above ground level 26, steam pipe 38 is connected in series with a flowmeter 98 and a valve 106. A temperature sensor 100 and a pressure sensor 102 are located immediately upstream of flowmeter 98, and a pressure sensor 104 is located immediately downstream of flowmeter 98, as shown in FIG. 1. The outlet of valve 106 is in fluid communication with a turbine 44. The output shaft of turbine 44 is coupled with an alternator 56 or other device, for energy recovery. The outlet of turbine 44 is in fluid communication with a condenser 58, which houses a separate heat absorbing channel 60 that is in fluid communication with an external fluid source.

That portion of condenser 58 in fluid communication with the outlet of turbine 44 is connected by a pipe to a junction 6. One pipe extends from junction 6 to a parallel combination of a pump 55 and a bypass valve 57. The outlet of the parallel combination leads to a connection in series with a pressure regulating valve 59, a flow rate regulating valve 61, and a flowmeter 62. The outlet of flowmeter 62 connects to a junction 4. A temperature sensor 84 and a pressure sensor 86 are located immediately upstream of flowmeter 62, and a pressure sensor 88 is located immediately downstream of flowmeter 62, as shown in FIG. 1. Two pipelines extend from junction 4. One line connects to a valve 63 and a flowmeter 64 in series, returning to junction 6. A temperature sensor 92 and a pressure sensor 94 are located between valve 63 and flowmeter 64, and a pressure sensor 96 is located between flowmeter 64 and junction 6, as shown in FIG. 1. The other line extending from junction 4 connects to valve 65. The outlet pipe of valve 65 connects to feed pipes 36 which connect to boiler 34. A pressure sensor 90 is located on feed pipe 36, between valve 65 and well cap 32.

Geothermal energy is recovered by circulating a heat transfer fluid, such as water, through the above-described system. Cooler liquid flows down feed pipe 36, into heat exchanger 34, where it vaporizes from the heat absorbed from isothermal zone 22. Pressure in well 20 forces the vapor to flow up vapor pipe 38, passing through ground level 26, flowmeter 98, and valve 106. The steam then flows through turbine 44 for energy recovery. Various ways of recovering energy from the fluid in steam pipe 38 may be used without departing from the scope of this invention.

A means for separating liquid elements from the product steam before it reaches turbine 44 may be beneficially incorporated without departing from the scope of the invention. As the vapor leaves turbine 44 and enters condenser 58, it is cooled by cold water flowing through heat absorbing channel 60. Due to cooling, all the vapor returns to a liquid state. The condensed liquid is then pumped back into feed pipe 36, repeating the cycle and forming a closed system.

In order to optimize product steam flow through steam pipe 38 at the exit of heat exchanger 34, and to avoid liquid build-up within heat exchanger 34, a control system regulates the flow rate and pressure of the liquid as it flows into feed pipe 36, as further discussed herein.

Figure 3:
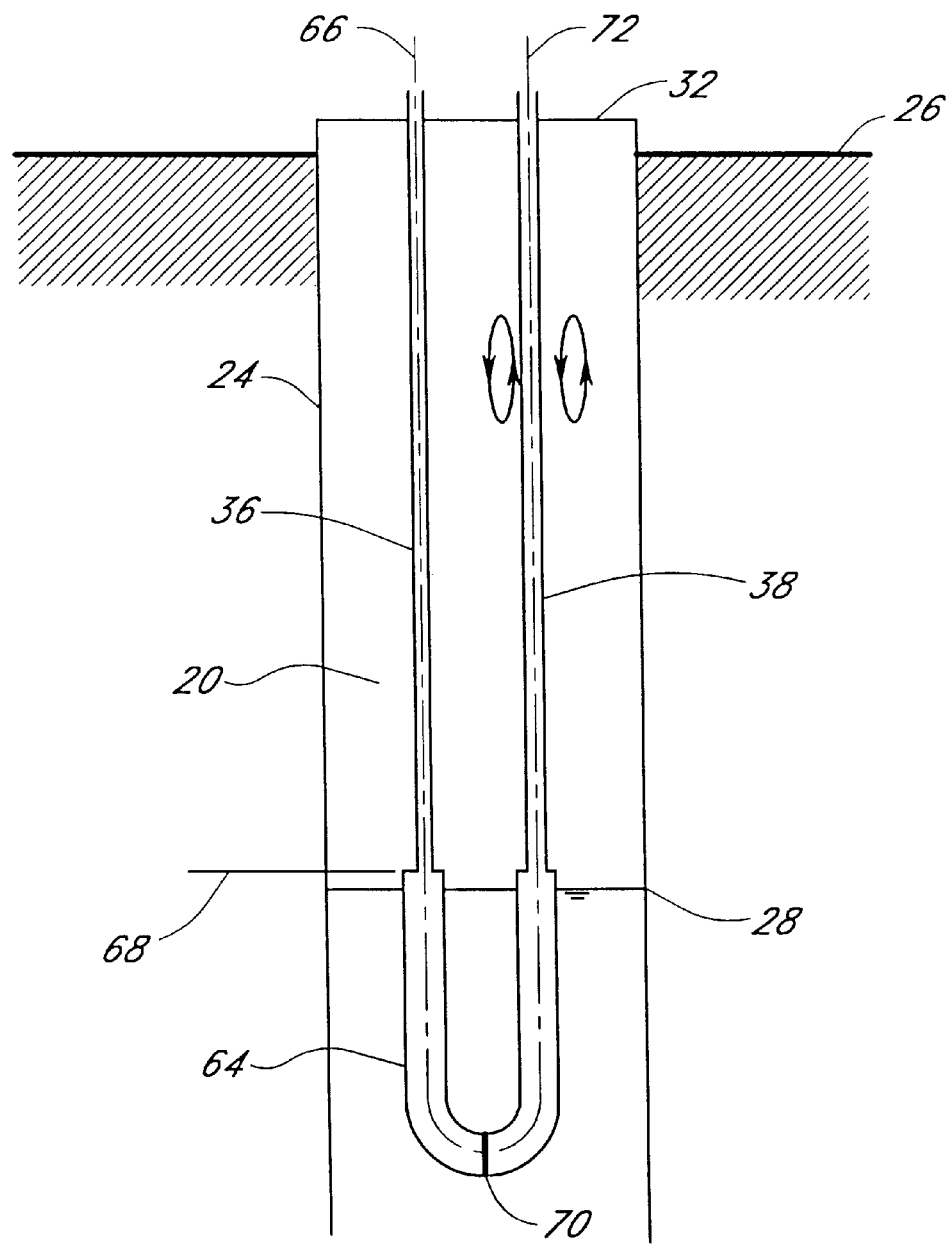
FIG. 3 is a schematic diagram of a geothermal well of FIG. 1.

The fluid flow rate through pipes 36 and 38 affects the temperature and quality of the vapor exiting the pipe 38 at surface 26. FIG. 3 shows heat exchanger 34 comprising a U-tube heat exchanger 64, submerged beneath the liquid brine level 28. The cap 32 seals the well casing 24, causing the temperature inside casing 24 to reach an equilibrium with the hot brine. The temperature inside the space defined by casing 24 will be hot, and will contain vapor from the brine level 28. Liquid is introduced into inlet 66 at ground level 26. As it flows down pipe 36 by gravity to point 68, it absorbs heat from the steam formed within the space defined by casing 24. At point 68, the liquid enters heat exchanger section 64, which has a large heat transfer surface area. A majority of the heat absorption by the liquid occurs within heat exchanger 64. Casing 24 is filled with brine from the geothermal source 22 (FIG. 1) up to a liquid level compatible with the temperature and pressure of the isothermal zone 22. At point 70, the heated liquid vaporizes. The saturated vapor flows up to point 72 at ground level 26, as product vapor in superheated condition.

The hydraulic gradient at inlet 66 defines the static pressures at point 70 and at point 72. Control of the boiling pressure at point 70 and product vapor pressure, temperature, and flow rate at point 72 is therefore achieved by regulation of the liquid pressure, temperature, and flow rate at inlet 66. A fluid's "flow rate" is the rate at which fluid mass travels. A pump, preferably at ground level, can regulate the flow rate at inlet 66. This allows for adjustment of these outlet vapor product parameters, as required by the end user.

Heat loss from exiting vapor in pipe 38 is reduced because casing 24 is sealed by cap 32. Sealed casing 24 operates like a heat pipe. Hot brine at the bottom of closed casing 24 evaporates and the hot vapor rises. Because of decreasing temperature of casing wall 24 towards ground level 26, the vapor will transfer heat to casing wall 24. The cooler vapor will then start to descend until it can meet and absorb heat from an up coming flow. If the descending vapor contacts a cooler wall at its condensing temperature, the vapor will condense. The condensed liquid will wet the wall and flow down by gravity. As the condensed liquid flows down the wall, it will eventually encounter a higher temperature section towards the bottom of the geothermal well 20 and will evaporate. The newly formed vapor then repeats its ascent. Hot vapor which avoided contact with any cooler walls and has not condensed will reach the top of the casing at slightly lower temperature than at the bottom.

With the U-tube heat exchanger 64 installed, the upward steam flow within capped casing 24 is conveniently restricted. A near stagnant steam jacket will envelope the inlet and exit tubes 36 and 38. The temperature of the steam jacket is believed to be fairly uniform. The temperature at the top is equal or slightly lower than at the bottom. Heat loss from the exiting vapor is effectively inhibited because of the low thermal conductivity of the stagnant vapor, and because the temperature differential between the exiting vapor and the steam jacket is low. The result is a hot, insulating environment for pipe 38, and a heating environment for feed pipe 36. This allows the product steam to flow inside the pipe 38 to ground level adiabatically, or at least with greatly reduced heat loss.

FIG. 4 shows an alternative heat exchanging means, wherein heat exchanger 34 comprises two boilers A and B, constructed to have greater heat transfer surface area, and cascaded by connecting them to a common exit steam pipe 38. Boilers A and B are submerged in brine, in a casing 24 with holes 31. The bottom of casing 24 is advantageously open as shown, but could be closed, or closed and perforated with holes 31 as shown. Each boiler has a separate feed pipe 36a, 36b connected to a liquid collection base 78a, 78b at one end, and in fluid communication with valve 65 at the other end. A plurality of vaporization tubes 80a, 80b extend upward from collection base 78a, 78b to a vapor collection manifold 82a, 82b, which is in turn connected to a common steam exit pipe 38.

Boiler A operates as follows: Cooler liquid is introduced into feed pipe 36a, flows down by gravity to collection base 78a, vaporizes as it absorbs heat from isothermal source 22 and flows up vaporization tubes 80a, recollects in vapor collection manifold 82a, and exits through common steam pipe 38. Similarly for boiler B, cooler liquid is introduced into feed pipe 36b, flows down to collection base 78b, vaporizes in vaporization tubes 80b, recollects in vapor collection manifold 82b, and exits through common steam pipe 38, joining exiting steam from boiler A. Any number n of boilers A or B could be cascaded within a well 20.

A control system regulates the flow rate and pressure of liquid as it flows down feed pipe 36. The purpose of the control system is to (i) insure that the liquid boils within the boilers of heat exchanger 34, (ii) maximize the rate of vapor production in the boilers, and (iii) avoid build-up of liquid within the boilers. Maximizing the rate of vapor production has the effect of maximizing the rate of energy recovery at turbine 44.

The control system operates as follows. Referring to FIG. 1, liquid from the tank of condenser 58 flows to the suction side of pump 55. As the liquid is pressurized by pump 55, bypass valve 57 is controlled to regulate pump 55 outlet pressure. Initially, pressure regulating valve 59, flow rate regulating valve 61, and valve 63 are open, and valve 65 is closed. Liquid flows from pump 55 to junction 4, then returns through valve 63 and flowmeter 64 to junction 6, forming a continuous loop. A microcontroller with proportional, integral, and differential (PID) feedback loop control regulates the outlet pressure of pump 55 by modulating bypass valve 57, based on an input signal from pressure sensor 86. Bypass valve 57 is adjusted until the pressure reading from pressure sensor 86 is substantially and steadily equal to a design target pressure.

After the pump 55 outlet pressure settles into steady state, the fluid flow rate is calculated from the measured inputs from temperature sensor 84 and pressure sensors 86 and 88, using standard equations. Flow rate regulating valve 61 is adjusted to regulate the flow rate so that it is substantially and steadily equal to a design target value. This is accomplished by maintaining a constant pressure differential across valve 61. Once the flow rate achieves steady state, the pressure regulating valve 59 becomes active, adjusting the measured pressure from pressure sensor 88 to the design target pressure. As valve 59 adjusts the pressure of the flow, valve 61 is continuously adjusted to maintain a constant pressure differential across valve 61, to maintain the flow rate.

When the pressure signal from pressure sensor 88 and the flow rate are at steady state, valve 65 is steadily opened while valve 63 is simultaneously steadily closed. It is important to note that valves 65 and 63 are not necessarily completely opened and closed, respectively. The flow rate through flowmeter 64 is calculated from the measured inputs from temperature sensor 92 and pressure sensors 94 and 96, similarly to the calculation of flow rate through flowmeter 62. The flow rate through feed pipe 36 is monitored by continuously calculating the flow rates through flow meters 62 and 64. This flow rate is ramped up (using a predetermined schedule) until it is at a design flow rate. At steady state, pressure regulating valve 59 switches its signal source from pressure sensor 88 to pressure sensor 90.

The microcontroller software has time frame data on when steam arrives at the exit 72 (FIG. 3), as well as the expected pressure and mass flow rate, after any liquid flows into feed pipe 36. At that time, valve 106 is gradually opened allowing steam to exit. Valve 106 is controlled such that the pressure reading from pressure sensor 102 ramps up in accordance with a predetermined schedule. The flow rate through feed pipe 36 is continuously compared with and regulated to match the steam flow through flowmeter 106, by controlling valves 63 and 65. The incoming flow through feed pipe 36 will be immediately decreased in the event incoming flow exceeds steam flow. At steady state, the inlet pressure at sensor 90, the flow rate, and steam pressure at sensor 102 will not vary with time.

In the preferred embodiment, the elements and operation described above are common to all the boilers of heat exchanger 34, with the exception of valve 65 and pressure sensor 90. A separate valve 65 and pressure sensor 90 are used for each boiler, to establish that boiler's inlet flow rate and pressure. However, a separate assembly of pumps and valves could be used for each boiler without departing from the concepts of this invention.

The control system sequentially brings on-line all the boilers in the fashion described above. After all the boilers are on-line, the steam flow from each boiler is maximized in the following manner: The liquid flow rate into Boiler n is minutely increased while pressure regulating valve 59 maintains the inlet pressure measured from sensor 90 at a constant value. By increasing pressure loss due to friction, this has the effect of decreasing Boiler n saturation pressure (and saturation temperature). However, the rest of the boilers are still operating at the design pressure. Therefore, Boiler n will boil more steam to maintain the system steam pressure. The additional steam flow from Boiler n will be detected by flowmeter 98. The flow rate into Boiler n is continually increased at constant pressure until flowmeter 98 no longer detects any flow increase. This has the effect of eliminating liquid build-up in the boiler. At this time the procedure terminates and results in Boiler n operating at maximum flow. The flow rate into Boiler n may optionally be decreased slightly at this point.

The same procedure is sequentially repeated for each boiler. In this manner, the steam flow for all boilers n (=1, 2, 3, . . .) is maximized. Because the individual boilers may have slightly different source temperatures, their flow rate requirements will not be identical. However, each boiler will operate at its optimum flow rate at the constant design pressure measured by sensor 90. The outlet steam pressure at sensor 102 and the flow rate through flowmeter 98 are thus controlled by the selected design target inlet pressure at sensor 90.

In time, fouling of the heat transfer surfaces will occur. Heat transfer performance of the boilers will decrease. This condition will be detected by a decrease in the steam flow through flowmeter 98. The steam pressure measured by sensor 102 will remain the same. The control system will automatically decrease the flow rate through feed pipe 36 because steam flow has decreased. To increase steam flow again, the inlet pressure at sensor 90 is decreased. This decreases the boiling temperature in the boilers, allowing them to boil more steam again and restore the flow rate at the original condition. However, the delivery pressure will be less than before and will be noticed in pressure sensor 102.

Referring to FIGS. 3 and 4, the system is advantageously designed so that the water in the heat exchanger 34 just boils at the lowest portion of the heat exchanger. That position corresponds to the bottom, center of the "U" in FIG. 3, and the base 78a, 78b, in FIG. 4. Advantageously, the boiling water is completely saturated at the bottom-most portion of the heat exchanger 34, with a quality of 1, but by the time the water vapor reaches the top of the heat exchanger 34, the vapor is dry steam with a quality of about 0. Additional heat may be acquired by the vapor as it travels in the pipe 38 upward toward the ground, as the space defined by casing 24 contains brine vapor.

The boiling point is achieved at the bottom of the heat exchangers 34 by selecting the system components to achieve a pressure and flow rate that results in boiling at the temperature of the bottom portion of the heat exchanger 34. The above calculations are illustrative, although other equations may be used to account for the various system variables. For a given brine temperature at a known depth, the boiling pressure and temperature are greatly influenced by inner diameter of pipes 36, 38, and the roughness of those pipes. As the system is used, the roughness of the pipes 36, 38 will change because the pipe diameter and roughness change due to pipe fouling. The flow rate may be varied by pump 62 to compensate for these changes. A temperature sensor may be used to monitor the brine temperature at the heat exchanger in order to vary the flow rate if the brine temperature varies sufficiently to affect performance of the system.

By sealing the casing 24 to entrap the brine vapor, there is thus advantageously provided a method and apparatus to facilitate heat exchange at the brine level while at the same time minimizing heat loss from exiting heat transfer fluids. Such reduced heat loss results in a higher thermal efficiency of the overall power cycle. By selecting the pipe size and regulating the flow rate of heat transfer fluids so that they boil within the heat exchanger, this method and apparatus provides a dry usable vapor for a heat exchanger located at a given depth in a brine of a given temperature. Because no brine is being removed from the well 20, natural resources are not depleted. By recirculating the operating fluid in a closed system, the operating efficiency is also enhanced. The operating fluid is advantageously water, but other operating fluids can be adapted for use with this system once the above disclosure is understood and appreciated by one skilled in the art.

There is thus provided a method and apparatus for recovering thermal energy from the earth at an improved efficiency. The flow rates for circulating the working fluid to achieve improved efficiency are discussed in more detail below.

Steam Manifold Analysis

Figure 5A:
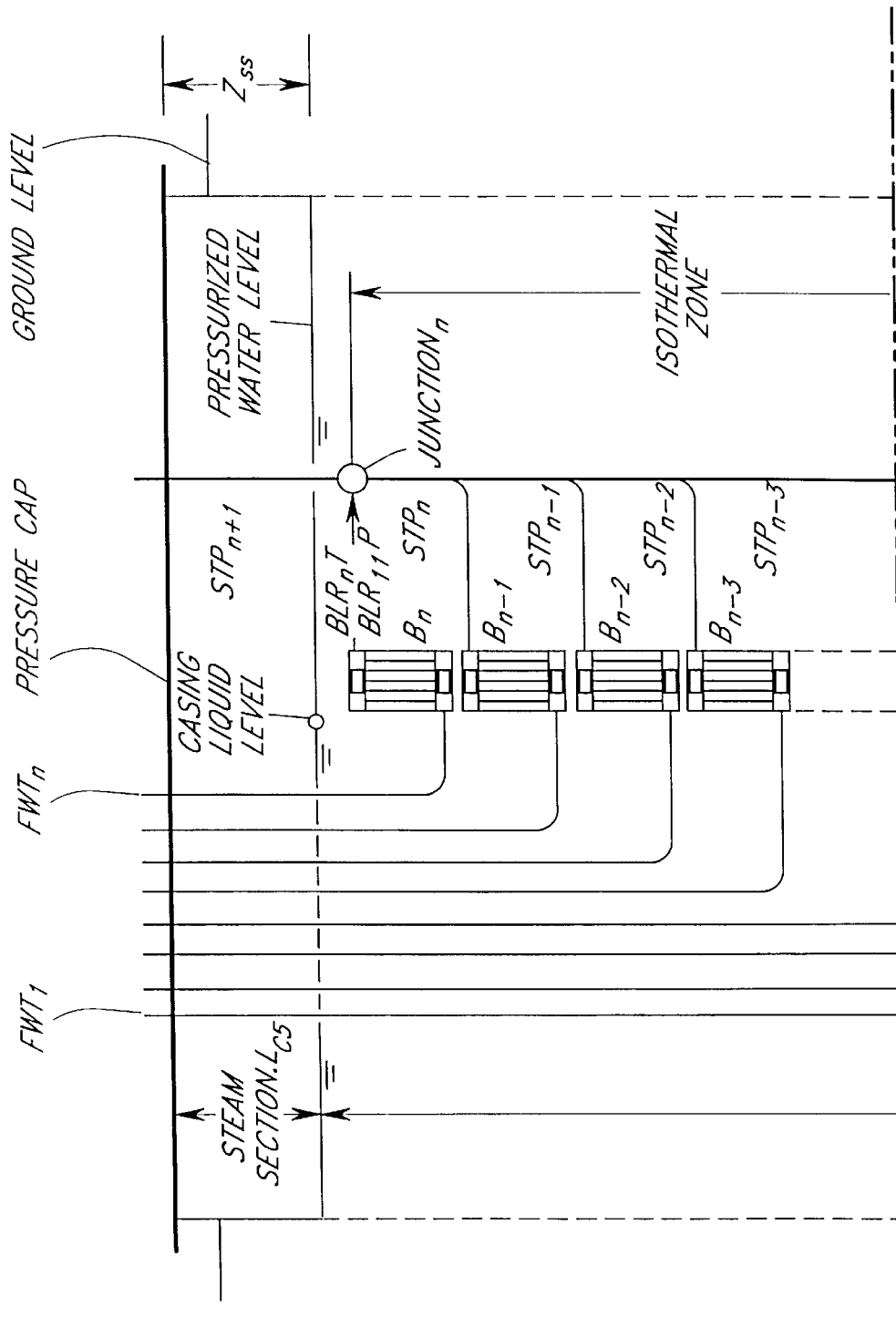
FIG. 5a is a schematic diagram of the top half of a geothermal well with a plurality of inlets and boilers for heat transfer fluids.
Figure 5B:
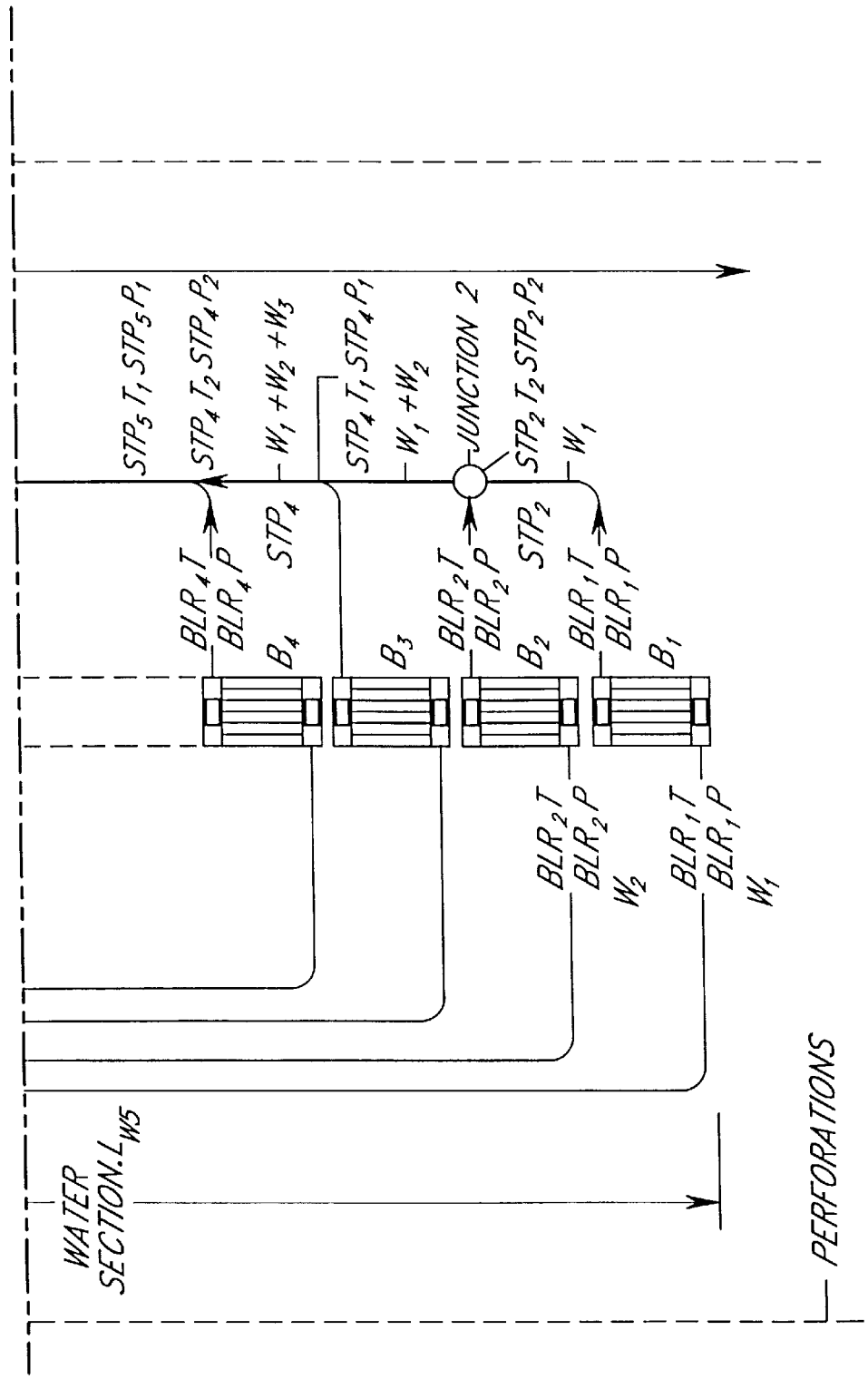
Figure 6:
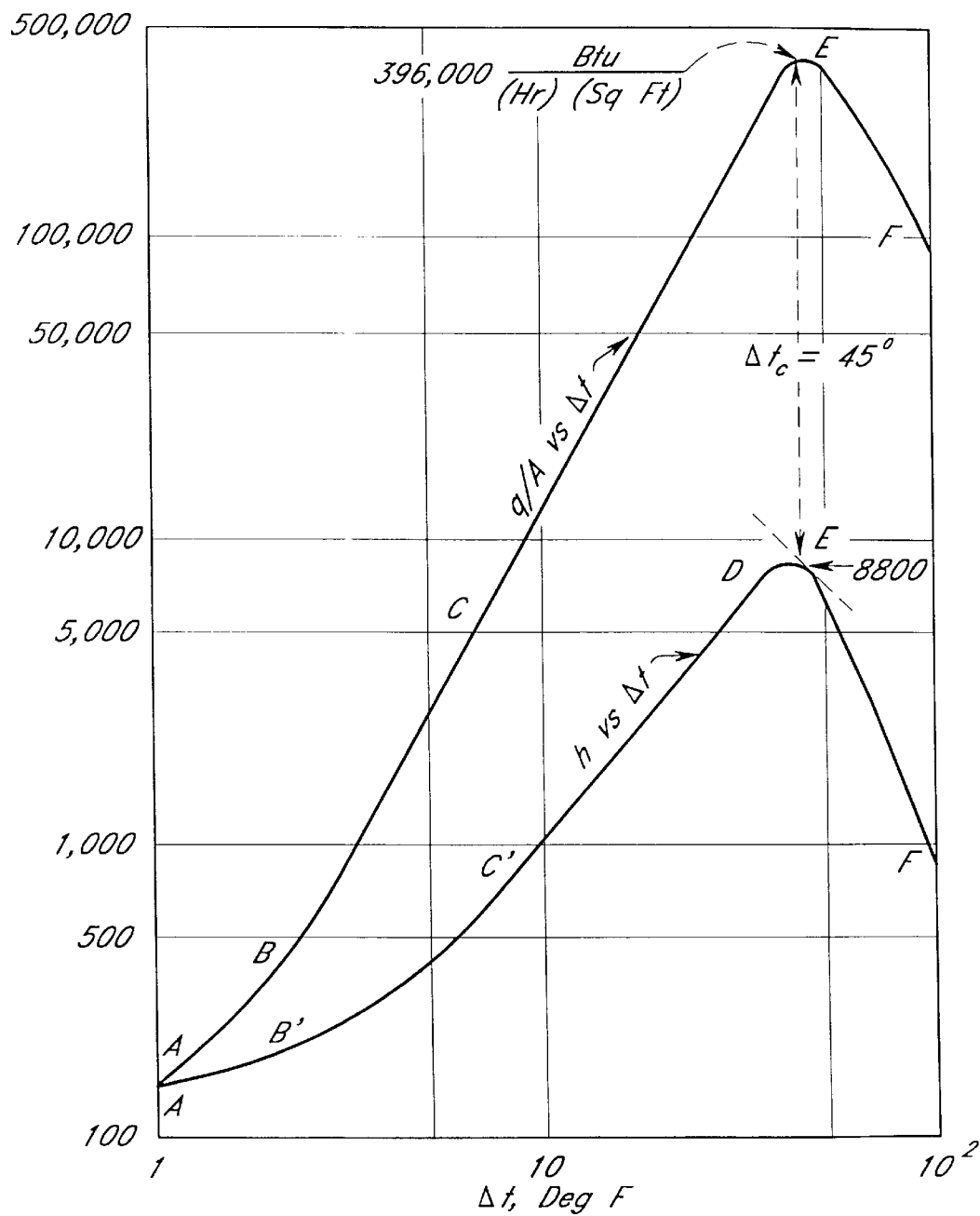
FIG. 6 shows two curves related to the heat transfer of water boiling within a submerged tube, at a pressure of 1 atm. The two curves respectively describe the relationships between heat transfer per unit surface area q/A versus temperature gradient $\Delta t$, as well as heat transfer coefficient h versus temperature gradient $\Delta t$

The sealed casing design is believed to provide a more efficient system as illustrated by the following analysis, based on FIG. 5, which shows n boilers. The analysis also shows one way to size the various system components. Given the vertical extent of the isothermal zone 22, assume that the brine boils at temperature (CSIT) which equals the isothermal zone temperature. Assume further that boiler 1, $BLR_1$, has operating temperature T. Using $BLR_1$,T, look up from a steam table the saturation pressure of boiler 1 ($BLR_1$,P). These two parameters together with the water flow rate into boiler 1 ($w_1$) become inlet data into steam pipe 2; i.e., steam pipe 2 inlet flow rate ($W_2$) equals evaporated $w_1$; steam pipe 2 inlet temperature ($STP_2T_1$) equals $BLR_1T$; and steam pipe 2 inlet pressure ($STP_2P_1$) equals $BLR_1P$.

Use $W_2$, $STP_2T_1$, $STP_2P_1$, CSIT and the steam pipe 2 outside diameter (OD), inside diameter (ID) and length (L) to calculate the outlet temperature $STP_2T_2$ and pressure $STP_2P_2$ of steam pipe 2, as follows:

The outside (water) heat transfer film coefficient $h_0$ of $STP_2$ is calculated from the equation:

$$h_0 = 92.8[(k^3 \rho^2 c \beta/\mu')(\Delta t/d_o)]^{0.25}$$

The transport properties of water at temperature CSIT that will be used in calculating $h_0$ can be found from standard tables. The tube side (steam) heat transfer film coefficient $h_1$ can be predicted from the equation:

$$(h_1 D/k) = (\mu/\mu_w)^{0.14}(N_{RE})^{0.8}(N_{PR})^{1/3}$$

The transport properties of steam that are used in the correlation for $h_1$ are at bulk temperature:

$$T_{BULK} = (STP_2T_1 + STP_2T_2)/2$$

Additionally, the tube side wall temperature ($T_{WL}$) must be calculated because the equation for $h_1$ includes ratio ($\mu/\mu_w$), where $\mu_w$ is the steam viscosity at $T_{WL}$.

Therefore, the calculation procedure for $STP_2T_2$ becomes an iteration process which is accomplished by first assuming a trial $STP_2T_2$, then solving for $h_1$, $h_0$, tube wall resistance $R_w$ and calculating the overall heat flow Q using the Fourier equation:

$$Q = U_0 A_0 (\Delta T)$$

The tubeside wall temperature is then calculated by using the same Fourier equation applied across each film resistance and the tube wall metal resistance. The trial value for $STP_2T_2$ is then verified by using it in the heat balance equation:

$$Q = W_2 C_P (STP_2T_2 - STP_2T_1),$$

where $C_P$ is specific heat of steam at $T_{BULK}$. The iteration process is repeated until the trial value and the calculated $STP_2T_2$ converge.

The transport properties and specific volume of steam are at $T_{BULK}$, available from standard reference tables. Calculate the Reynolds number and the friction factor:

$$f = 0.003183(N_{RE})^{-0.267} 1,000 < (N_{RE} \leq 100,000$$

$$f = 0.001991(N_{RE})^{-0.226} N_{RE} > 100,000$$

In flowing through steam pipe 2 (Length=$L_2$), the steam loses pressure due to viscous friction. Pressure loss in the pipe, $\Delta F_2$, can be calculated from the tube-side friction equation:

$$\Delta F = (fGt^2 L)/[5.22*10^{10} Ds(\mu/\mu_w)^{0.14}]$$

Finally, using the Bernoulli equation, calculate outlet pressure:

$$STP_2P_2 = STP_2P_1 - L_2/V_G/144 - \Delta F_2$$

Outlet pressure $STP_2P_2$ is used to look up from standard steam tables the saturation temperature for boiler 2, $BLR_2T$. Note that this deliberately makes the boiler 2 operating pressure $BLR_2P$ equal to steam pipe 2 outlet pressure $STP_2P_2$.

As shown in junction 2 in FIG. 5, boiler 2 outlet steam ($w_2$, $BLR_2T$, $BLR_2P$) and steam pipe 2 outlet steam ($W_2$, $STP_2T_2$, $STP_2P_2$) will mix at constant pressure $STP_2P_2$ (=$BLR_2P$). The mixing equation is $$W_2 C_{PB}(STP_3T_1 - BLR_2T) = w_1 C_{PS}(STP_2T_2 - STP_3T_1)$$

In this equation, $C_{PB}$ is the specific heat (at constant pressure) of steam from the boiler 2 and is evaluated at average temperature ($STP_3T_1 + BLR_2T)/2$. Similarly, $C_{PS}$ is the specific heat of steam from the steam pipe 2 at different temperature and is evaluated at average temperature ($STP_2T_2 + STP_3T_1)/2$. Because $STP_3T_1$ is unknown, the equation is solved by iterating the equation around $STP_3T_1$ using the steam data for specific heat $C_P$ at constant pressure versus temperature.

The inlet conditions into steam pipe 3: $W_3$, $STP_3T_1$, $STP_3P_1$ are thus estimated.

The above routines are repeated until the inlet and outlet conditions of the predetermined number of steam pipes (n−1) are calculated. After the last iteration, the product steam flow rate, pressure and temperature at the last junction n: ($W_n$, $STP_nT_n$, $STP_nP_n$) will have been determined. In addition, the operating parameters of boilers 1 to n, namely ($w_1$, $BLR_1T$, $BLR_1P$), ($w_2$, $BLR_2T$, $BLR_2P$), ($W_3$, $BLR_3T$, $BLR_3P$), . . . ,($w_n$, $BLR_nT$, $BLR_nP$), will also have been determined.

Outlet Steam Pipe Analysis

From the parameters ($W_n$, $STP_nT_n$, $STP_nP_n$) at junction n in FIG. 5 and dimensions OD, ID and L of steam pipe $STP_{n+1}$, the outlet conditions of the product steam (W, P, T) are determined. Sensible heating of the steam inside $STP_{n+1}$, is calculated by considering the heating surface in only that portion of the steam pipe 38 that is submerged in the hot brine in the casing. The section of pipe 38 in the vapor space inside the casing 24 does not absorb appreciable sensible heat from the casing, because the outside surface (casing side) natural convection heat transfer film coefficient is comparatively low. However, the length used in the pressure loss calculation includes the total length from the junction n to the outlet at the wellhead.

Boiler Analysis

Using parameters ($w_1$, $BLR_1T$, $BLR_1P$), ($w_2$, $BLR_2T$, $BLR_2P$), ($w_3$, $BLR_3T$, $BLR_3P$), . . . , ($w_n$, $BLR_nT$, $BLR_nP$), and CSIT, check the heat transfer performance of boilers 1 to n to ensure that each has enough heat transfer surface area. Inside heat transfer area (Q/A) of each boiler, and heat transfer coefficient $h_1$, are estimated using the relationship described in Heat Transmission, McAdams, 2nd Ed., McGraw Hill, at page 296. Estimate $h_1$ from the curve showing $h_1$ vs $\Delta t_w$ and Q/A from the curve showing q/A vs $\Delta t_w$, by using the inside temperature difference, $$\Delta T_1 = T_w - BLR_n T$$

The outside natural convection coefficient $h_0$ is estimated from $$h_0 = 92.8[(k^3\rho^2 c\beta/\mu')_f (\Delta t/d_0)]^{0.25}$$

using CSIT for the outside liquid bulk temperature. The heat transfer surface area of each boiler $BLR_n$ is increased or decreased by adding or removing tubes from the boiler tube layout. The allowable tube bundle diameter must fit within the constraints required by the inside diameter of casing 24. The ratio of tube bundle length ($L_B$) to tube bundle diameter ($D_B$), should be less than 4; i.e., $L_B/D_B < 4$.

If necessary, the boiler temperature assumed for boiler 1 might have to be decreased to satisfy the constraints. If that is so, then the whole process above is repeated at the new boiler temperatures.

Analysis of Feed Tube 36

Boiler data ($w_1$, $BLR_1T$, $BLR_1P$), ($w_2$, $BLR_2T$, $BLR_2P$), ($W_3$, $BLR_3T$, $BLR_3P$), . . . ,($w_n$, $BLR_nT$, $BLR_nP$), and CSIT are next used to estimate the heat transfer and pressure loss characteristics of feed tubes $FWT_1$ to $FWT_n$.

Starting with data associated with feed tube (36) $FWT_1$: ($w_1$, $BLR_1T$, $BLR_1P$), CSIT, water section height $L_{ws}$, tube inside diameter ID and outside diameter OD, $FWT_1$ heat transfer performance is estimated. The tubeside heat transfer coefficient $h_1$ at the average inside water temperature $T_{BULK}$ is calculated from $$(h_1 D/k) = (\mu/\mu_w)^{0.14}(N_{RE})^{0.8}(N_{PR})^{1/3},$$

and the outside (casing side) heat transfer coefficient $h_0$ is calculated from $$h_0 = 92.8[(k^3\rho^2 c\beta/\mu')_f (\Delta t/d_0)]^{0.25}$$

The metal tube wall resistance to heat transfer, $R_w$, can be calculated from $$R_w = (OD) \ln(OD/ID)/(2k_w)$$

Submerged length $L_{ws}$ is used for the latent heat transfer estimate because heat absorption from steam section height $L_{ss}$ is negligible. To determine $L_{ws}$, solve for height $L_{ss}$ as follows:

In accordance with the Bernoulli equation, the steam section height $L_{ss}$ equals the height of the steam column that saturation pressure $P_{SAT}$ at casing temperature CSIT can support, i.e., $$L_{ss} = (P_{SAT}) 9144 / V_G)$$

Therefore, height $L_{ws}$ equals the depth at the inlet into boiler 1 from ground level minus $L_{ss}$. Given the tube OD and $L_{ws}$, the outside heat transfer surface area of $FWT_1$ is estimated.

The overall heat transfer temperature $\Delta T (= LMTD)$ can be calculated from the Fourier equation, $$Q = U_0 A_0 (\Delta T)$$

Given water inlet temperature $T_{WIN}$, the water outlet temperature $T_{OUT}$ can therefore be predicted. $T_{OUT}$ is implicit in equation, $$LMTD = (T_{OUT} - T_{WIN}) / \ln[(CSIT - T_{OUT})]$$

Therefore, $T_{OUT}$ is easier solved by successive iteration. The desired $T_{OUT}$ must be such that it equals boiler 1 inlet temperature $BLR_1T$. If this is not the case, the number of $FWT_1$ tubes is increased until $T_{OUT}$ approaches $BLR_1T$.

With $T_{OUT}$ known, $$T_{BULK} = (T_{OUT} + T_{WIN}) / 2$$

Tubeside coefficient $h_1$ previously calculated above must now be corrected by using the liquid transport properties at $T_{BULK}$. The above iterations are repeated until convergence of $T_{OUT}$ to $BLR_1T$ is achieved. Static pressure at the inlet is calculated next as follows.

Tubeside friction resistance coefficient f is a function of the Reynolds number $N_{RE}$ at $T_{BULK}$. It was correlated by Nikuradse for turbulent ($N_{RE} > 2100$), tubeside flow and is shown in equation, $$f = 0.003183(N_{RE})^{-0.267} \quad 1,000 < (N_{RE} \leq 100,000$$

$$f = 0.001991(N_{RE})^{-0.226} \quad N_{RE} > 100,000$$

In accordance with the Bernoulli equation, the static pressure at the $FWT_1$ outlet $P_{STAT}$ is calculated from, $$P_{SAT} = (L_{ss} + L_{ws}) / V_L / 144 - \Delta F,$$

where $V_L$ is the tubeside water specific column at $T_{BULK}$ and $\Delta F$ is the viscous friction pressure loss, which is estimated from, $$\Delta F_f = (fGt^2 L) / [5.22 * 10^{10} Ds (\mu/\mu_w)^{14}]$$

$P_{STAT}$ must equal boiler 1 pressure $BLR_1P$. If $P_{STAT}$ does not equal $BLR_1P$, the ID of $FWT_1$ must be adjusted until the values converge, i.e., $P_{STAT} = BLR_1P$.

Because the ID of $FWT_1$ was changed to satisfy the static pressure requirements, the heat transfer performance of $FWT_1$ above must be re-calculated. This procedure is iterated until the two conditions $P_{STAT} = BLR_1P$ and $T_{OUT} = BLR_1T$ are simultaneously satisfied for $FWT_1$.

The preceding algorithm is repeated for all n feed tubes 36.

Specifically, in reservoirs that are isothermal for not less than 320 feet in the vertical direction, that occur below ground level not less than 1,640 feet deep, and not deeper than 4,920 feet, the steam boiler configuration disclosed is estimated to generate a total of 16 pounds mass per second of saturated steam. To achieve this performance, 40 heat exchangers, 8 feet long each, are required. Each heat exchanger shall have individual feed inlet tubes 36. The ratio of length (L) to inside diameter (D) of the individual feed inlet tubes 36 from ground level must be constrained to vary linearly from L/ID=26,968±2,673 at 1,640 feet to 78,160±2,685 at 4,920 feet.

There is thus provided a way of determining an advantageous flow rate for efficiently recovering energy from the earth, which is advantageously used with the apparatus and method of the present disclosure.

ALTERNATIVE EMBODIMENTS

In a first alternative embodiment, an insulated vapor tube 38, with coaxial outer casing sealed at the top near ground level and open at the bottom to the geothermal brine, may be used. The annular space formed by the coaxial outer casing and the tube 38 is formed by low thermal conductivity radial supports between the tube 38 and the coaxial tube. Flow cut-outs allow vapor flow in the annulus. Inlet tubes for incoming fluid are located on the outside of the outer cylinder and are in fluid communication with the heat exchanger at the bottom of the well.

Another alternative embodiment can be formed by modifying the construction just described by integrating liquid flow channels around the inside surface of the outer cylinder. The liquid channels are connected to the inlet of the heat exchanger 34 at the bottom end of the outer cylinder. The liquid absorbs heat from annular vapor while flowing down by gravity. This construction will decrease heat transfer area required for the heat exchanger section.

It will be understood that the above described arrangement of apparatus and the methods therefrom are merely illustrative of applications of the principles of this invention and many other embodiments and modifications may be made without departing from the spirit and scope of the invention as described herein, and as defined in the claims.

What is claimed is:

1. A geothermal energy conversion system that extracts heat from a heat source below the Earth's surface by circulating a fluid through a closed system, the heat source having a temperature above the boiling point of the fluid, comprising:

a geothermal well having a casing defining a space that extends from ground level to the heat source, the casing having an upper end, a heat exchanger in thermal communication with the heat source to boil the fluid within the heat exchanger, and a system of valves and at least one pump configured to regulate the flow of fluid into and through the heat exchanger; and a cap at the upper end of the casing to seal the casing and form geothermal vapor within the space to provide a heat pipe effect to insulate the thermal communication with the heat exchanger.

2. A geothermal energy conversion system as set forth in claim 1, wherein the system of valves and at least one pump regulates at least one of flow rate or pressure of said fluid so that the fluid vaporizes within the heat exchanger, the rate of vapor production in the heat exchanger being set at a predetermined value with the system of valves and at least one pump adjusted to control buildup of liquid within the heat exchanger to ensure boiling occurs within the heat exchanger.

3. A geothermal energy conversion system as set forth in claim 2, wherein the system of valves comprises two valves in series that cooperate to regulate the flow rate of the fluid.

4. A geothermal energy conversion system as set forth in claim 2, wherein the system of valves comprises two valves in series that cooperate to regulate the pressure of the fluid.

5. A geothermal energy conversion system as set forth in claim 1, wherein the heat exchanger comprises a plurality of boilers, each connected to a vapor exit pipe.

6. A geothermal energy conversion system as set forth in claim 2, wherein the flow rate is adjusted in response to the incremental change in the amount of steam output from the boiler that occurs in response to an incremental change in the flow rate caused by the series of valves.

7. A geothermal energy conversion system as set forth in claim 2, wherein the pressure is adjusted in response to the incremental change in the amount of steam output from the boiler that occurs in response to an incremental change in the pressure caused by the series of valves.

8. A geothermal energy conversion system as set forth in claim 2, further comprising a plurality of valves in fluid communication, comprising:

a pump for pumping working fluid through the heat exchanger by pumping and pressurizing a first fluid stream from a fluid source;

a first valve in parallel with the pump adjusted to regulate the pressure of the fluid exiting the pump;

a second valve, downstream of the pump, adjusted to achieve a desired flow rate of the fluid in the first fluid stream;

a third valve, downstream of the pump, adjusted to achieve a desired pressure of the fluid in the first fluid stream;

a dividing junction dividing the first fluid stream into a second fluid stream and a third fluid stream, the second fluid stream being placed in fluid communication with the heat exchanger and the third fluid stream being in fluid communication with the fluid source;

a fourth valve in the second fluid stream, between the dividing junction and the heat exchanger, adjusted to regulate the flow rate of the fluid in the second fluid stream; and a fifth valve in the third fluid stream, between the dividing junction and the fluid source, adjusted to regulate the flow rate of the fluid in the third fluid stream, wherein the valves may be adjusted to achieve a desired flow rate in the second fluid stream by incrementally opening the fourth valve and incrementally closing the fifth valve.

9. A geothermal energy conversion system as set forth in claim 8, further comprising:

a sixth valve, downstream of the heat exchanger, to regulate the pressure of the fluid exiting the heat exchanger, wherein the valves may be adjusted to achieve one of the desired flow rate or pressure in the heat exchanger by adjusting the fourth valve and the fifth valve, and monitoring a correspondingly increasing flow rate of the fluid exiting the heat exchanger.

10. A geothermal energy conversion system that extracts heat from a heat source below the earth's surface by circulating a fluid through a closed system, the heat source having a temperature above the boiling point of the fluid, comprising:

a heat exchanger in thermal communication with the heat source to increase the temperature of fluid within the heat exchanger, the heat exchanger having an outlet in fluid communication with an energy extraction system to generate energy from the heated fluid, the heat exchanger having an inlet in fluid communication with a source of fluid; and means for regulating the buildup of liquid within the heat exchanger.

11. A geothermal energy conversion system as set forth in claim 10, wherein the regulating means comprises means for regulating the flow rate of the fluid.

12. A geothermal energy conversion system as set forth in claim 10, wherein the regulating means comprises a means for regulating the pressure of the fluid.

13. A geothermal energy conversion system as set forth in claim 10, wherein the heat exchanger is in fluid communication with the energy extraction system through a hole in the earth that is sealed to form a heat pipe that creates an insulating environment for the heated fluid flowing to the energy extraction system.

14. A method of converting geothermal energy from a heat source beneath the earth's surface and having a temperature greater than the boiling point of a working fluid circulating within a closed system, comprising the steps of:

placing a heat exchanger in thermal communication with the heat source and flowing the working fluid through the heat exchanger;

regulating at least one of the flow rate or pressure of the fluid so that the fluid vaporizes within the heat exchanger and the rate of vapor production in the heat exchanger is maintained at a predetermined value, while controlling buildup of liquid within the heat exchanger.

15. A method of converting geothermal energy as set forth in claim 14, wherein the regulating step comprises the step of regulating the flow rate of the fluid.

16. A method of converting geothermal energy as set forth in claim 14, wherein the regulating step comprises the step of regulating the pressure of the fluid.

17. A method of converting geothermal energy as set forth in claim 15, comprising the further step of forming a heat pipe around a portion of the closed system that is in thermal communication with the heat exchanger to form a heat pipe that creates an insulating environment for the heated fluid leaving the heat exchanger.

18. A method of converting geothermal energy as set forth in claim 16, comprising the further step of forming a heat pipe around a portion of the closed system that is in thermal communication with the heat exchanger to form a heat pipe that creates an insulating environment for the heated fluid leaving the heat exchanger.

19. A method of converting geothermal energy, as set forth in claim 14, wherein the regulating step is comprises the steps of:

flowing the working fluid through the heat exchanger by pumping and pressurizing a first fluid stream from a fluid source with a pump;

controlling a first valve in parallel with the pump, to regulate the pressure of the fluid exiting the pump;

controlling a second valve, downstream of the pump, to achieve a desired flow rate of the fluid in the first fluid stream;

controlling a third valve, downstream of the pump, to achieve a desired pressure of the fluid in the first fluid stream;

dividing the first fluid stream at a dividing junction into a second fluid stream and a third fluid stream, the second fluid stream entering the heat exchanger and the third fluid stream returning to the fluid source;

controlling a fourth valve in the second fluid stream, between the dividing junction and the heat exchanger to regulate the flow rate of the fluid in the second fluid stream;

controlling a fifth valve in the third fluid stream, between the dividing junction and the fluid source, to regulate the flow rate of the fluid in the third fluid stream;

achieving a desired flow rate in the second fluid stream by incrementally opening the fourth valve and incrementally closing the fifth valve;

controlling a sixth valve, downstream of the heat exchanger, to regulate the pressure of the fluid exiting the heat exchanger;

incrementally increasing the flow rate of the fluid entering the heat exchanger by controlling the fourth valve and the fifth valve, and monitoring a correspondingly increasing flow rate of the fluid exiting the heat exchanger; and discontinuing the incremental increase after the flow rate of the fluid exiting the heat exchanging portion ceases to increase.

20. A method of constructing a geothermal energy conversion system that converts energy from an isothermal zone beneath the surface of the Earth, the isothermal zone comprising a mixture of liquid brine and vapor brine where the liquid brine has an upper surface level separating the liquid brine and the vapor brine, comprising the steps of:

forming a geothermal well in communication with the isothermal zone;

creating a casing for the well that defines a space within the well that extends into the isothermal zone;

forming perforations in the walls of the casing below a level at which the liquid brine surface level will contact the casing so liquid brine enters through the perforations into the space;

placing a heat exchanger within the space at a depth below the liquid brine surface level;

connecting an inlet pipe and an outlet pipe to the heat exchanger;

placing a system of pumps and valves in fluid communication with the inlet pipe, the system of pumps and valves being configured to regulate at least one of the pressure or flow rate of fluid flowing into and through the heat exchanger; and sealing the casing to form brine vapor within the space while still communicating fluid to and from the heat exchanger through the sealing.

21. A method of constructing a geothermal energy conversion system as set forth in claim 20, comprising the further steps of controlling the flow rate of a fluid flowing through the inlet pipe so that the fluid vaporizes within the heat exchanger.

22. A method of constructing a geothermal energy conversion system as set forth in claim 20, comprising the further step of controlling at least two valves connected in series to regulate the pressure of a fluid flowing through the inlet pipe so that the fluid vaporizes within the heat exchanger.

23. A method of constructing a geothermal energy conversion system as set forth in claim 20, comprising the further step of using the pump and valves to regulate the pressure and flow rate in the inlet pipe to control the rate of vapor production in the heat exchanger and to control the buildup of liquid within the heat exchanger.

24. A method for regulating the flow rate and pressure of a fluid flowing through a heat exchanger in a geothermal well, comprising the steps of:

forming a first fluid stream from a fluid source, by pumping and pressurizing fluid from the fluid source with a pump;

controlling a first valve in parallel with the pump, to regulate the pressure of the fluid as the fluid exits the pump;

controlling a second valve, downstream of the pump, to achieve a desired flow rate of the fluid in the first fluid stream;

controlling a third valve, downstream of the pump, to achieve a desired pressure of the fluid in the first fluid stream;

dividing the first fluid stream at a dividing junction into a second fluid stream and a third fluid stream, the second fluid stream entering the heat exchanger and the third fluid stream returning to the fluid source;

controlling a fourth valve in the second fluid stream, between the dividing junction and the heat exchanger, to regulate the flow rate of the fluid in the second fluid stream;

controlling a fifth valve in the third fluid stream, between the dividing junction and the fluid source, to regulate the flow rate of the fluid in the third fluid stream;

achieving a desired flow rate in the second fluid stream by incrementally opening the fourth valve from a closed position and incrementally closing the fifth valve from an open position;

controlling a sixth valve, downstream of the exit of the heat exchanger, to regulate the pressure of the fluid as it exits the heat exchanger;

incrementally increasing the flow rate of the fluid entering the heat exchanger, by controlling the fourth valve and the fifth valve, and monitoring a correspondingly increasing flow rate of the fluid exiting the heat exchanger; and discontinuing the incremental increase when the flow rate of the fluid exiting the heat exchanger ceases to increase.

25. A geothermal energy conversion system as set forth in claim 1, further comprising a first flowmeter configured to detect the flow rate of fluid entering said heat exchanger, and a second flowmeter configured to detect the flow rate of fluid exiting said heat exchanger, wherein liquid buildup inside said heat exchanger can be controlled by controlling the flow rate through said first flowmeter in response to the flow rate through said second flowmeter.

26. A geothermal energy conversion system as set forth in claim 10, further comprising a means for regulating at least one of flow rate or pressure of the fluid provided to the inlet so that the fluid vaporizes within the heat exchanger, and for regulating the rate of vapor production in the heat exchanger at a predetermined value.

27. A method of converting geothermal energy as set forth in claim 14, further comprising the step of controlling liquid buildup inside said heat exchanger by controlling at least one of flow rate or pressure of fluid flowing into said heat exchanger based upon flow rate exiting said heat exchanger.

* * * * *